United States Patent
Ludwig et al.

(10) Patent No.: US 6,487,218 B1
(45) Date of Patent: *Nov. 26, 2002

(54) METHOD AND DEVICE FOR CONFIGURING A LINK

(75) Inventors: Reiner Ludwig, Düren; Martin Gerdes, Herzogenrath, both of (DE)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,894

(22) Filed: Jan. 11, 1999

(30) Foreign Application Priority Data

Jan. 12, 1998 (DE) ........................ 198 00 772

(51) Int. Cl.[7] .................................. H04J 3/10
(52) U.S. Cl. ...................... 370/469; 370/230
(58) Field of Search ............... 370/351–3, 469, 370/473, 476, 230, 229; 709/227, 228, 229, 225; 710/49; 713/200, 202

(56) References Cited

U.S. PATENT DOCUMENTS 5,550,816 A * 8/1996 Hardwick et al. .......... 370/397
6,041,054 A * 3/2000 Westberg .................... 370/389
6,101,189 A * 8/2000 Tsuruoka .................... 370/392
6,308,213 B1 * 10/2001 Valencia ..................... 709/201

FOREIGN PATENT DOCUMENTS

WO 96/00468 A1 1/1996
WO 96/21984 A2 7/1996

OTHER PUBLICATIONS

Stevens, Richard; TCP/IP Illustrated, vol. 1; 1994; Addison Wesley Longman, 26–7.*
Simpson, W., "The Point–to–point Protocol (PPP)", Network Working Group RFC: 1661, IETF, 1994.
Lloyd, B., "PPP Authentication Protocols", Network Working Group RFC: 1334, IETF, 1992.
McGregor, G., "The PPP Internet Protocol Control Protocol (IPCP)", Network Working Group RFC: 1332, IETF, 1992.
Reynolds et al., J., "Assigned Numbers", Network Working Group RFC: 1340, IETF, 1992.

* cited by examiner

Primary Examiner—David Vincent (57) ABSTRACT

The invention relates to method and device for improving the link configuration speed of high-latency links, such as circuit switched links or satellite links, that use chatty protocols, which require sequential configuration phases, such as standard PPP in accordance with RfC 1661. In the initial link configuration phase, a standard LCP packet is sent out, followed by at least one masked packet that will be discarded silently by a peer operating in accordance with the standard protocol, but whose contents will be processed by a peer operating in accordance with the invention. The initial standard LCP packet produces compatibility with the standard protocol, whereas the sending of masked packets containing configuration information (PAP, CHAP, ICPC, etc.) allows two peers operating in accordance with the invention to accomplish the configuration phases in parallel, such that a link can be configured and ready to transmit network level packets, such as IP packets, much more quickly than with the standard protocol, such as PPP.

23 Claims, 9 Drawing Sheets

METHOD AND DEVICE FOR CONFIGURING A LINK

TECHNOLOGICAL BACKGROUND

The present invention relates to a communication device and method used for configuring a link, preferably one that accesses a communication network that operates by exchanging packets. An example of such a communication network is the internet.

The internet is a network of computers, where communication is conducted by means of units referred to as "packets". This means that the information to be transmitted is distributed over such packets, and these packets can be sent individually and independently over the network. This communication is governed by a protocol, in this case the so-called internet protocol IP. A protocol is a set of rules that determines the format and the general communication procedure, so that each member of the network must conform to the protocol in order to be able to communicate with the other members.

There are different possibilities of accessing the internet. The most basic is via a dedicated line, i.e. a line that is constantly connected to another computer that is a part of the network. The computer accessing the network via a dedicated line thereby becomes a member of the network, i.e. the network is thereby extended. The communication along the line is conducted in accordance with the IP. However, a dedicated line is expensive, so that such an arrangement only makes sense for a user requiring permanent access to the internet and/or the quick transmitting of large data amounts.

An alternative to a dedicated line is a pseudo-dedicated connection that is only established if a connection to the internet is required, but then acts just like a dedicated line. A typical example of such a connection is a modem link from a single user to a server in the internet, such as a university computer or commercial internet access server. The user only establishes a connection to the internet when necessary, so that the high costs entailed by a dedicated line are not incurred, but the established connection lets the user become a full member of the internet, because the connection then acts like a dedicated line.

Such a pseudo-dedicated connection between two points (the computer wishing to temporarily access the internet on the one hand, and the server in the internet that is typically connected to a plurality of other internet members on the other) requires its own protocol. Two known protocols are SLIP (Serial Line Internet Protocol) and PPP (Point to Point Protocol). In recent years, PPP has become the dominant protocol for such pseudo-dedicated connections.

PPP is defined in the Networking Group RfC (Request for Comments) 1661, editor W. Simpson, July 1994. PPP is comprised of three main components: a method of encapsulating multi-protocol datagrams, a datagram being a unit of transmission in the network layer (such as IP), a ink control protocol (LCP) for establishing, configuring and testing the data-link connection, and a family of network control protocols (NCP) for establishing and configuring different network-layer protocols. The Point-to-Point Protocol is designed to transport packets between two so-called peers, i.e. the two ends of a link conforming to the protocol. These links provide full-duplex simultaneous bi-directional operation.

The communication across the link established by PPP is accomplished such that a datagram, i.e. the unit of transmission in the network layer, such as IP, is encapsulated into one or more frames and passed to the data link layer. The unit of transmission on the data link layer is a frame, where said frame may include a header and/or a trailer, along with some number of units of data. Usually, a packet is mapped to a frame.

The LCP is used to agree upon the encapsulation format options, handle varying limits on sizes of packets, detect configuration errors, and terminate the link. Other optional facilities are the authentication of the identity of its peer on the link, and the determination when a link is functioning properly and when it is failing.

Figure 2:
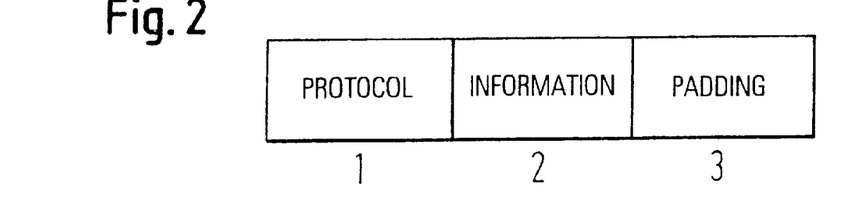
FIG. 2 shows an encapsulation for the Point-to-Point Protocol in accordance with RfC 1661.

FIG. 2 shows a PPP encapsulation in accordance with RfC 1661. Reference numeral 1 indicates a protocol field, 2 an information field, and 3 a padding field. These fields are transmitted in an order from left to right.

The protocol field 1 is one or two octets (an octet is another expression for an 8-bit byte), and its value identifies the datagram encapsulated in the information field 2 of the packet. Protocol field values in the "10*" to "3*" range identify the network-layer protocol for specific packets, and values in the "8*" to "b*" range identify packets belonging to the associated NCPs, if any. Protocol field values in the "4*" to "7*" range are used for protocols with low volume traffic which have no associated NCP. Protocol field values in the "c*" to "f*" range identify packets as link-layer control protocols, such as LCP. RfC 1661 makes the following reservations for said values:

TABLE 1

| Value (in hex) | Protocol Name |
| --- | --- |
| 0001 | Padding Protocol |
| 0003 to 001f | reserved (transparency inefficient) |
| 007d | reserved (Control Escape) |
| 00cf | reserved (PPP NLPID) |
| 00ff | reserved (compression inefficient) |
| 8001 to 801f | unused |
| 807d | unused |
| 80cf | unused |
| 80ff | unused |
| c021 | Link Control Protocol |
| c023 | Password Authentication Protocol |
| c025 | Link Quality Report |
| c223 | Challenge Handshake Authentication Protocol |

The information field is 0 or more octets. The information field contains the datagram for the protocol specified in the protocol field. The maximum length for the information field is termed the Maximum Receive Unit (MRU), which defaults to 1500 octets or bytes, including the padding. By negotiating, consenting PPP implementations may use other values for the MRU.

Finally, the information field may be padded with an arbitrary number of octets up to the MRU. This padding is contained in the padding field and it is the responsibility of each protocol to distinguish between padding octets and real information.

In accordance with RfC 1661, in order to establish communications over a point-to-point link, each end of the PPP link must first send LCP packets to configure and test the data link. This is an absolute requirement. After the link has been established, the peer may be authenticated, i.e. this is an option. Then, PPP must send NCP packets to choose and configure one or more network-layer protocols, i.e. this is again an absolute requirement. Once each of the chosen network-layer protocols has been configured, datagrams from each network-layer protocol can be sent over the link. The link will remain configured for communication until explicit LCP packets close the link down, or until some external event occurs (e.g. an inactivity timer expires).

It should be remarked that there are three basic answers for a peer to send out in response to the receipt of a configure request packet over the link: sending an ACK packet (acknowledged), e.g. to indicate that a setting proposed in the received packet is accepted, sending a NACK packet (not acknowledged), e.g. to indicate that a proposed setting is not accepted, or sending a reject packet, to thereby indicate that the received packet cannot be accepted, e.g. because it has the wrong syntax. The peer can also react to the receipt of a packet by discarding it without sending out a reject packet. This is consequently referred to as "silent" discarding.

As already mentioned, the Link Control Protocol (LCP) is used to establish the connection through an exchange of configure packets. This exchange is complete, and the LCP opened state entered, once a configure ACK (acknowledgment) packet has been both sent and received. During this so-called link establishment phase, only LCP packets are processed and any non-LCP packets are necessarily discarded without processing.

After the link establishment phase, an authentication phase may follow, i.e. is optional. However, if an implementation desires that the peer authenticate with some specific authentication protocol, then it necessarily must request the use of that authentication protocol during the link establishment phase. Another phase that can follow the link establishment phase, is the link quality determination phase, in which link quality determination packets are exchanged. Authentication and link quality determination can take place concurrently. After the authentication phase, the following phase of exchanging NCP packets is only entered if the authentication is successful, otherwise a link termination is enacted. During this phase, only LCP packets, authentication protocol packets and link quality determination packets are processed and all other packets received during this phase are necessarily discarded without processing.

Once the above mentioned phases have successfully been completed, each network layer must necessarily be separately configured by the appropriate Network Control Protocol (NCP). An example of such a NCP is the IPCP (Internet Protocol Control Protocol). After a NCP has reached an opened state, PPP will carry the corresponding network-layer protocol packets. Any supported network-layer protocol packets received when the corresponding NCP is not in the opened state, must necessarily be discarded without processing.

Finally, a link termination phase comprises using the LCP to close the link through an exchange of terminate packets. Any non-LCP packets received during this phase must necessarily be discarded without processing.

PROBLEM UNDERLYING THE INVENTION

In recent years, not only the importance of the internet as a communication means and information tool has expanded, but also the providing of wireless communication networks like cellular telephone networks has become almost ubiquitous. As a consequence, there is a demand for devices and methods for establishing links to the internet for wireless or cellular subscribers.

If the internet is accessed via cellular networks, the Point-to-Point Protocol (PPP) is most commonly used for configuration of the pre-established circuit-switched link. This will be explained with reference to FIG. 3.

Figure 3:
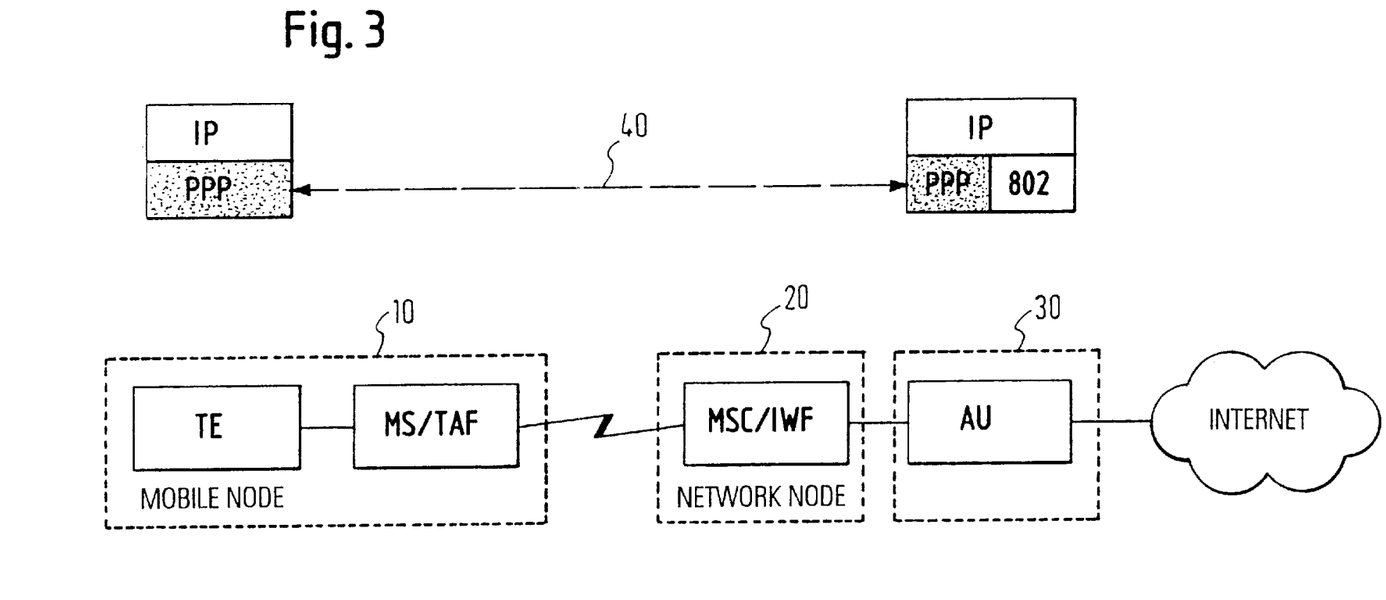
FIG. 3 shows a schematic setup of a connection between a mobile node of a cellular communication system and a network node, to thereby establish a connection from said mobile node to the internet.

The bottom part of FIG. 3 shows an arrangement in which the terminal equipment TE in a mobile node 10 communicates with a network node in order to communicate with the internet. The terminal equipment is e.g. a laptop computer. The TE is connected to the MS/TAF, which means Mobile Station/Terminal Adaptation Function. The mobile station is e.g. a mobile telephone, and the terminal adaptation function is e.g. fulfilled by a PCMCIA interface connecting the mobile telephone and the laptop computer. The mobile station MS establishes a communication link to the mobile switching center MSC. The mobile switching center is connected to an access unit AU via an inter-working function IWF. The access unit AU terminates the circuit switched connections and routes the network layer PDUs to and from the internet.

As indicated in the upper part of FIG. 3, the terminal equipment (TE) in mobile node 10 and the direct access unit (AU) are controlled such that the pre-established traffic channel between them is configured in accordance with the PPP, and then network layer protocol data units (PDU), e.g. IP packets, are transmitted over the channel. The double arrow 40 represents the configured link between the TE and the AU, said link being configured in accordance with PPP to thereby transmit IP packets. The number 802 refers to a framing standard for LANs.

The different communication phases required by the PPP described above are shown schematically in FIG. 4. The communication begins when the two peers in the TE and AU are informed (e.g. receive the message) that the basic communication link is established, i.e. that the link is up. In the example of FIG. 3, the mobile unit, e.g. a cellular telephone, will indicate an established circuit switched connection to the terminal equipment, e.g. the laptop computer. In the above described example this basic link is the circuit switched link provided by the cellular system to which mobile station MS and mobile switching center MSC belong. For simplicity, FIG. 4 only shows the requests sent by the terminal equipment (TE) and the acknowledgments sent by the access unit (AU), but it should be understood that in response to the basic link being up, in fact both peers start transmitting these requests almost simultaneously. It is also important to note that FIG. 4 shows the absolute ideal case for configuring and communicating in accordance with PPP, i.e. it shows the minimum amount of information exchange.

In the first phase, the link establishment phase, an LCP request packet and an LCP request acknowledgement packet are exchanged. As explained above, this phase is mandatory and serves the purpose of establishing the PPP link. The second phase shown is the authentication phase, which consists in exchanging a PAP/CHAP request packet and a PAP/CHAP request acknowledgement packet (PAP =Password Authentication Protocol; CHAP=Challenge-Handshake Authentication Protocol). This phase is optional, but usually employed, as it increases security. The third phase is then the NCP phase, in this case an IPCP phase (IPCP=Internet Protocol Control Protocol), i.e. the network control protocol to be opened is an internet control protocol. This phase comprises the exchange of an IPCP request packet and an IPCP request acknowledgment package. This phase is mandatory. Only after this IPCP phase is a link established that conforms to PPP and IP, such that IP packets can now be exchanged and therefore the terminal equipment in mobile node 10 be fully connected to the internet.

Figure 4:
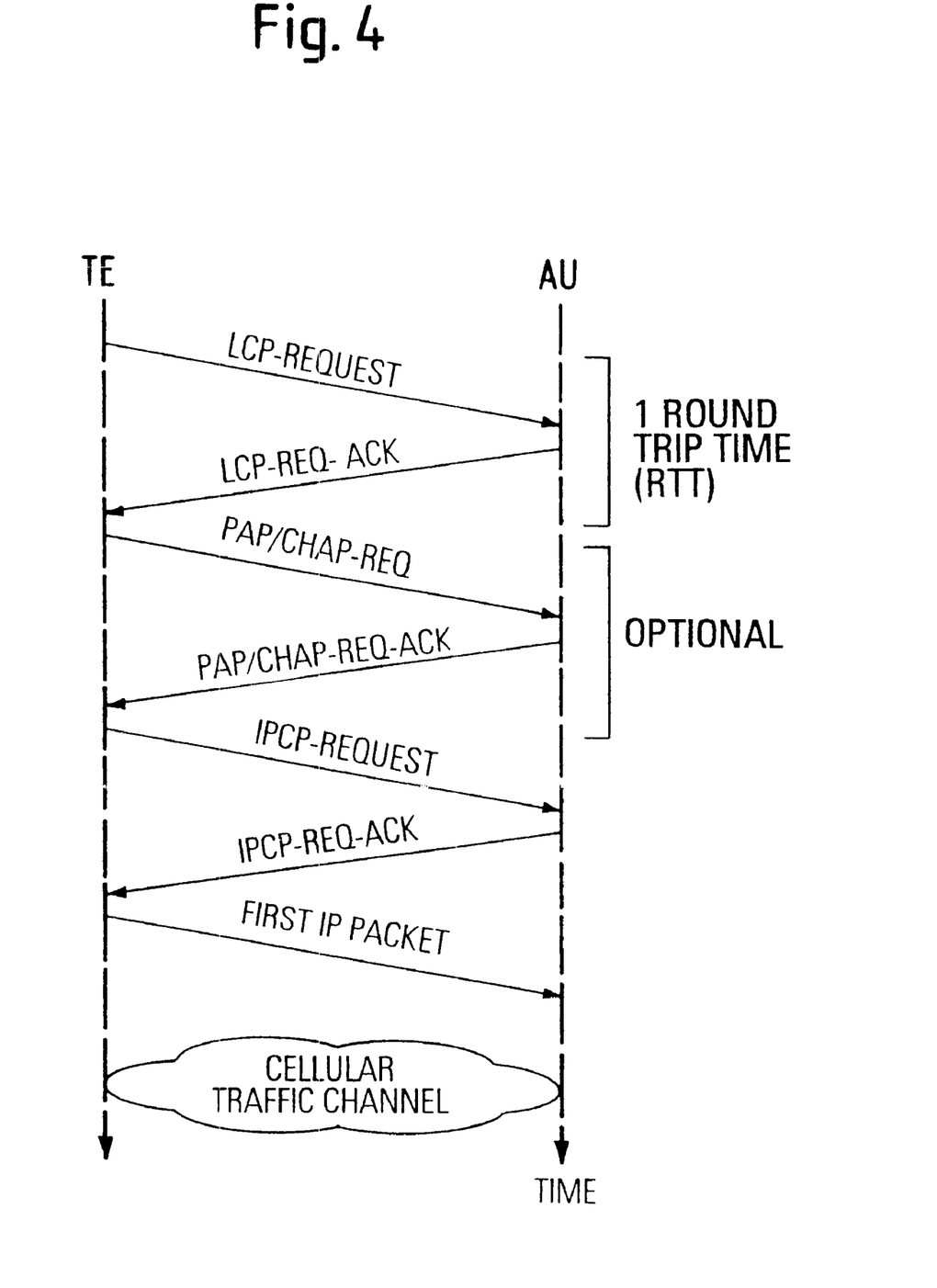
FIG. 4 shows the sequence of packets exchanged between the terminal equipment in the mobile node of FIG. 3 and the direct access unit in the network node of FIG. 3, when a link is established in accordance with the standard Point-to-Point Protocol, where it should be remarked that the figure only shows the series of packets initiated by TE and it shows the fastest possible link configuration.

The duration for exchanging one set of packets is referred to as the round trip time (RTT), see FIG. 4. In other words, the round trip time is the time that passes between the sending of a request packet and the receipt of the corresponding acknowledgment packet.

It should be noted that the the CHAP requires a three-way handshake initiated by the AU (not shown in FIG. 4), as opposed to the two-way handshake required by the PAP, which is initiated by the TE, as shown in FIG. 4. However, this does not increase the duration of the phase, because the AU can send the first CHAP packet back to back with the last LCP request acknowledgment packet that it sends.

According to the requirements for PPP laid out in RfC 1661, each of the above mentioned phases must be completed before the next can begin. Consequently, the absolute minimum configuration time before IP packets can be sent is 2 or 3 RTTs depending on wether authentication is chosen or not. In practice, the duration for establishing a link can be as long as 7 RTTs or more. This is due to the negotiating in the LCP or IPCP phases. In the case that the PPP peers prefer different link settings, the negotiating of the options handled by the LCP and the NCPs can take several RTTs, because NACKs (not acknowledged) and new requests have to be exchanged. If link quality determination protocol packets are additionally exchanged, then the establishment time becomes even longer. The RTT of traffic channels in cellular networks can be as high as 850 ms. In GSM, as an example of a cellular standard, the RTT is never below 600 ms and usually around 750 ms, independent of how many traffic channels are bundeled together for a single connection—as done in HSCSD (High Speed Circuit-Switched Data).

This problem of long link establishing times, which a user perceives as waiting times before data can be sent or received over the internet, is bothersome to the user. It should be noted that this problem is not restricted to systems operating according to PPP as laid out in RfC 1661, but will be encountered in any system that has the above mentioned strict requirements regarding the completing of specific connection phases before subsequent connection phases can be started.

OBJECT OF THE INVENTION

Accordingly, an object of the present invention is to provide an improved method for controlling a device that is designed to establish a link to a packet exchange network (e.g. the internet).

Another object is to provide a corresponding device.

DISCLOSURE OF INVENTION

These objects are achieved by a method for controlling a communication device that is connected to another communication device by a communication link, for configuring said communications link for packet exchange, where one of said two communication devices is on the other side connected to a packet exchange network conforming first protocol (e.g. IP), wherein said method comprise the possibility of controlling said device such that the communication over said link is conducted by exchanging packets in accordance with a second predetermined protocol (e.g. PPP) that encapsulates at least said first protocol and comprises a third protocol (e.g. LCP) for establishing and configuring said link, and wherein said second protocol requires that a packet sent over said link comprises a protocol field, for which predetermined values are reserved for predetermined protocols, where at least one specific value is reserved for said third protocol, and other predetermined values are not used by said second protocol, and an information field containing data associated with the protocol indicated by the value contained in said protocol field, and the process of configuring a link comprises at least one phase in which packets are exchanged such that only packets indicating said third protocol in their protocol fields are processed and all other packets are discarded, said method furthermore comprising the steps:

sending out a packet of a first type over said link that conforms to said second protocol and indicates said third protocol in its protocol field, and subsequently sending out at least one packet of a second type that has a value in its protocol field that is allowed by said second protocol but not used by said second protocol, such that said second packet is not rejected by communications devices operating in accordance with said second protocol, but is discarded without processing by these, waiting for the receipt of a packet of said first type and storing said packet once it is received, waiting a predetermined time for the subsequent receipt of a packet of said second type, processing said stored packet of said first type if no packet of the second type is received and subsequently operating in accordance with said second protocol, and processing said packet of the second type if such a packet is received.

In accordance with the invention, if the two peers connected to a link operate according to the above method, it is possible to avoid the sequential steps of link configuration employed by the second protocol (e.g. PPP) by sending all the necessary information (e.g. LCP, IPCP etc.) in parallel, i.e. concurrently in both directions. This greatly increases the speed of link configuration. On the other hand, if only one of the peers operates in accordance with the present invention, and the other in accordance with said second protocol, then the inventive peer will automatically fall back into a mode of operation that conforms to said second protocol. Thus compatibility is retained.

As a consequence, the present invention can be integrated into existing systems without any compatibility problems to other systems operating in accordance with the second protocol (e.g. standard PPP). On the other hand, if both peers forming a point to point link conform to the present invention, then data communication by packet exchange can be established much faster than with the second protocol (e.g. standard PPP).

The present invention is therefore especially advantageous when applied to those parts of a cellular communication system that handle the configuration of point to point links to packet exchange networks like the internet.

However, the present invention is not restricted thereto and can also be advantageously applied to all other high-latency communication links, e.g. satellite links, and/or to the modification of other so-called "chatty" protocols, i.e. protocols that require the exchange of an excessive number of packets when configuring a link, of which standard PPP in accordance with RfC 1661 is only an example.

EXPLANATION OF FIGURES

The present invention will now be described in detail with the help of preferred embodiments, which are only given as examples and do not restrict the scope, and with reference to the appended figures, in which.

DETAILED DESCRIPTION

According to a preferred embodiment of the invention, which is presently considered the best mode of carrying out the invention, the inventive concept is applied to those parts of a cellular communication network that are responsible for establishing point to point links to a packet exchange network such as the internet. These are the terminal equipment (TE) and the direct access unit (AU) shown in FIG. 3. The previous description of the hardware in the lower part of FIG.3 is therefore not repeated.

In this preferred embodiment, the present invention is used to configure a pre-established circuit-switched link according to a modification that is different from the PPP defined in RfC 1661, but where compatibility to said standard PPP is retained. Consequently, the above disclosure regarding the known Point-to-Point Protocol is herewith fully incorporated into the invention disclosure.

In the following description, the term standard PPP peer will refer to a peer that only conforms to PPP as defined in RfC 1661, and CSD-PPP peer will refer to a peer that operates in accordance with the inventive concept, i.e. which conforms to the inventive packet exchange mode, but can also operate in accordance with standard PPP. The term CSD means circuit switched data, and thereby refers to the fact that the present embodiment is used to configure a circuit-switched link.

Also, the term masked PPP packet will be used to refer to packets (such as LCP, PAP, CHAP, IPCP or IP packets) having a syntax and semantics as defined in RfC 1661, but that carry an "incorrect" protocol field. "Incorrect" means that the values used in protocol fields of masked PPP packets to indicate the protocol must necessarily not be reserved, but on the other hand must be uniquely chosen such that they conform to RfC 1661 in terms of how a valid protocol field is defined. As an example, values from the 0x8001 to 0x801f hex range are acceptable candidates (see Table 1). These requirements stem from the fact that a standard PPP peer should discard these "incorrect" packets and not reject them. If a standard PPP peer is e.g. in the link establishment phase, it will only process LCP packets and will discard other packets such as PAP or CHAP packets.

As a consequence, when a standard PPP peer receives a masked PPP packet, this packet will be silently discarded.

On the other hand, CSD-PPP peers are controlled in such a way that they can identify masked PPP packets. Masked packets are packets, in which certain protocols (e.g. LCP) are assigned to values that are allowed to be contained in the protocol fields of PPP packets, i.e. to the values that are acceptable to the standard PPP, but not used thereby (e.g. the above mentioned 0x8001 to 0x801f hex range). The information contained in the information field of a masked packet conforms to the same rules as for standard packets. As an example, if a peer sends out an LCP packet for resetting the MRU to a given value, then the standard packet and the corresponding masked packet will have an identical information field, but a different protocol field, where the standard packet will contain the value prescribed by PPP and the masked packet will contain one of the above mentioned values that are allowable for a protocol field in a PPP packet, but not used by PPP, i.e. not reserved for a specific protocol by PPP (see Table 1).

The CSD-PPP peer will then process the masked packets and establish a link and transmit data in accordance with the information in the masked packet. The system and method in accordance with the invention is designed in such a way that the strict separation of phases required by standard PPP (see FIG. 4) is not required. Instead both peers will take on a predefined set of LCP and IPCP options, e.g. the set defined in Table 2 below, and start off with the LCP, authentication and IPCP phase and the exchange of IP packets concurrently. "Concurrently" means that in response to the message that the link to be configured is "up" (established), both CSD-PPP peers will almost simultaneously start sending packets, but in contrast to standard PPP they will not follow the procedure shown in FIG. 4, according to which each phase must be successfully completed before the next can begin. Much rather they will first send out the standard LCP packet described above, in order to guarantee compatibility, and then send out one or more masked packets. This sending of masked packets is bi-directional and almost simultaneous, as both peers will start sending in response to the link up message. These masked packets will contain a part or all the desired or necessary packets for configuring the link, e.g. the packets sent sequentially in the example of FIG. 4. In other words, the sequential process shown in FIG. 4 can be accomplished in parallel. This results in a tremendous gain in configuration speed, especially for high-latency links. As an example, if the two CSD-PPP peers do not need to negotiate any settings and all the configurations are mutually acceptable, then the configuration time is reduced to 0.5 RTTs in the inventive system. This basic aspect of making the configuration phases parallel will be explained in more detail later, in connection with FIG. 5 to 7.

TABLE 2

| Protocol | Option | Predefined |
| --- | --- | --- |
| LCP | Maximum Receive Unit | 576 |
| LCP | Authentication Protocol | Not required |
| LCP | Quality Protocol | Not required |
| LCP | Magic Number | Not required |
| LCP | Protocol Field Compression | Required |
| LCP | Address and Control Field Compression | Required |
| IPCP | IP-Addresses | Not required |
| IPCP | IP-Compression Protocol | Not required |
| IPCP | IP-Address | Required |
| IPCP | TCP/IP Header Compression | Required |

The process of establishing a link is conducted by a CSD-PPP peer in such a way that first a standard LCP packet (one fully conforming to the regular process of link establishment in accordance with standard PPP) is sent, and back-to-back after that a masked packet or preferably a set of masked packets is sent back-to-back. If the receiving peer is a standard PPP peer, then it will accept and process the first LCP packet and silently discard the masked packet or packets.

In this way, compatibility is retained.

If the receiving peer is a CSD-PPP peer, then it is controlled to silently discard the standard LCP packet and instead process the masked packets. This is done by first temporarily storing the standard LCP packet and then waiting to see if masked packets follow. If masked packets follow, then the stored standard LCP packet is silently discarded and the masked packets are processed. However, if no masked packets follow, then the standard LCP packet is processed to thereby establish a standard PPP link in full accordance with standard PPP. This means that the sequential completion of phases shown in FIG. 4 is adhered to. Therefore, if a CSD-PPP peer communicates with a standard PPP peer, then it is controlled to automatically fall back into standard PPP and act like a standard PPP peer.

The same operation is carried out in a CSD-PPP peer that sends out a standard LCP packet and a subsequent set of masked packets, as indicated above, but only receives a standard LCP packet and no masked packets from the other peer. Thereby this CSD-PPP peer learns that the other peer is a standard PPP peer, and is controlled to automatically fall back into the standard PPP mode.

In summary, the above embodiment works in such a way that, in order to establish a packet link, a CSD-PPP peer will first send out a standard [PPP] LCP packet followed back to back by an initial set of masked packets, where said masked packets contain more than just the LCP information. These masked packets preferably contain all or at least a part of the configuration information that in a standard PPP system is sent in sequential phases (see FIG. 4). In the inventive system, the information sent in the standard packets in sequential phases shown in FIG. 4 is sent in said initial set of masked packets after said first standard LCP packet. In this way, the system and method of the present invention allow a parallel configuration process.

A receiving CSD-PPP peer will silently discard the standard LCP packet and process the initial set of masked packets to thereby establish and use the link in accordance with the information in the masked packets. On the other hand, if the receiving peer is a standard PPP peer, it will only process the standard LCP packet and silently discard the initial set of masked packets, to thereby establish a standard PPP link, i.e. return response packets that in sequence and type fully conform to standard PPP. If a CSD-PPP peer only receives standard LCP packages (i.e. not followed by masked packets) or does not receive any masked response packets to its masked packets, then it automatically falls back into a standard PPP mode, to thereby function like a standard PPP peer.

The actions of processing or discarding are achieved by the system and method of this embodiment of the invention by using values allowed for a standard protocol field of a PPP packet, so that the masked packets are not rejected by the standard PPP, said values on the other hand not being reserved for use by standard PPP, so that they are not processed by standard PPP, but only silently discarded. In a general sense, this means that the embodiment of the invention is designed to be compatible with the standard PPP by being defined such that the masked packets are not rejected by PPP but are silently discarded.

Figure 1:
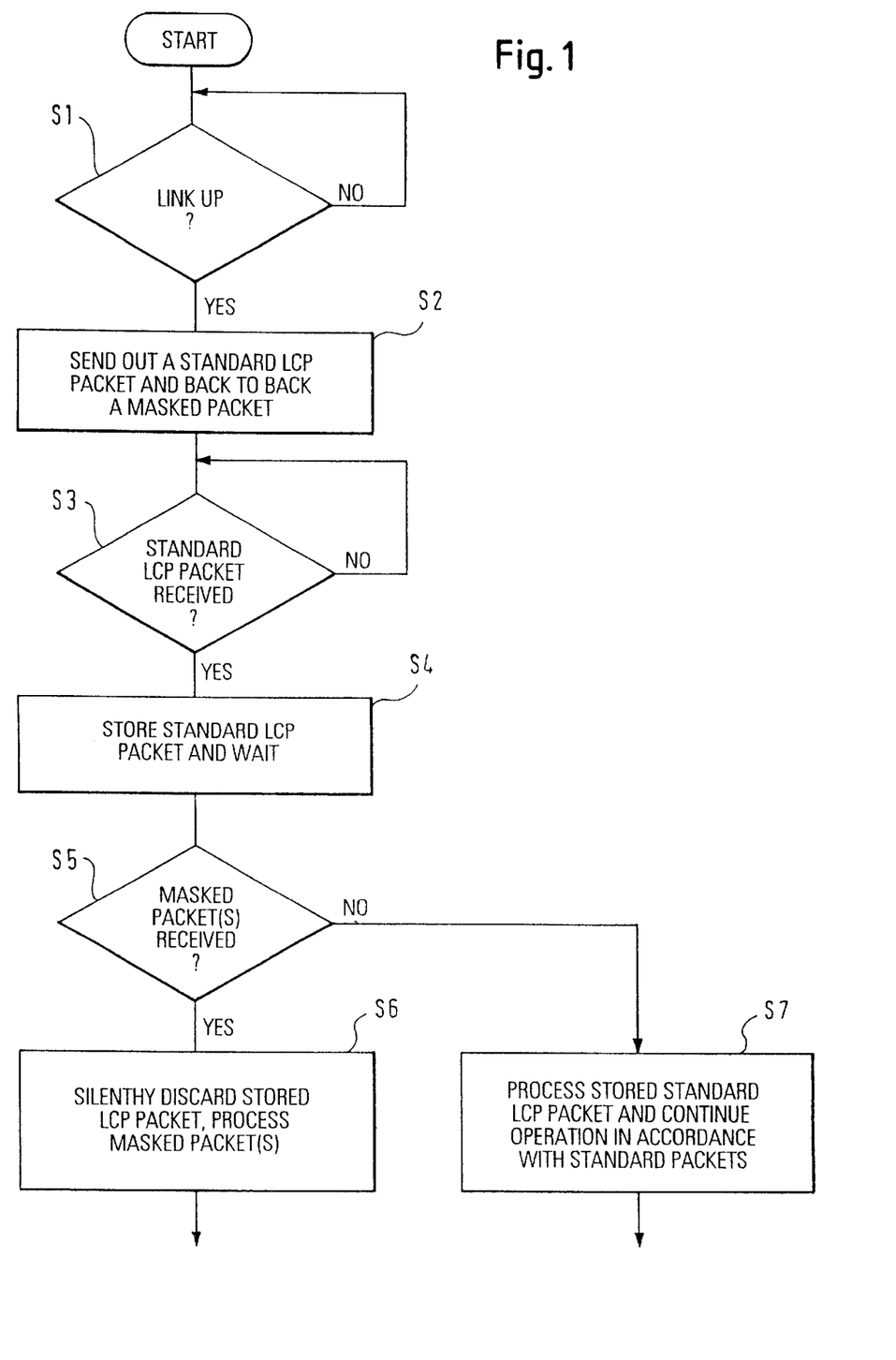
FIG. 1 shows a flowchart describing the basic method of the present invention.

The basic method of the invention is described by the flowchart of FIG. 1. In a first step S1, the device waits until a communication link is established. For example, the terminal equipment shown in FIG. 3 will receive a link up message from the mobile station MS indicating that a circuit switched link has been established. Then, in step S2, a standard LCP packet that conforms to standard PPP is sent out, and back to back therewith at least one masked packet, preferably a set of masked packets. In step S3, the device waits until a standard LCP packet has been received from the other end of the link. Once this standard LCP packet is received, it is stored in step S4. In step S5, the device checks if the other end of the link has sent masked packets or not. If it has, the method branches to step S6, in which the masked packets are processed and communication is conducted in accordance with the information in the masked packets and in possibly subsequent masked packets. On the other hand, if the decision in step S5 is negative, then the method branches to step S7, in which the device falls back into a standard PPP mode and processes only those packets that conform to standard PPP, in order to establish a link that fully conforms to standard PPP.

It should be noted that the processing following step S7 fully conforms to standard PPP. The processing following step S6 can be such that the CSD-PPP peer continues to send and process masked packets after the link is configured, e.g. masked IP packets, or it can be such that the masked packets are only used for configuration and after link configuration the CSD-PPP peer reverts to sending standard network level packets, e.g. standard IP packets conforming to PPP.

In accordance with this embodiment, the initial set of masked packets may contain any type of information, such as LCP, PAP, CHAP, IPCP, IP or others, in contrast to standard PPP, which in the first configuration phase allows only LCP packets. The system and method of the present embodiment of the invention provides the possibility of a parallel configuration process, in contrast to the sequential process prescribed for standard PPP. As a consequence, the system in accordance with the above embodiment can establish a link and start sending IP packets as quickly as after 0.5 RTT, which is a considerable gain of speed with respect to standard PPP.

Which types of packets (PAP, CHAP, etc.) are sent as masked packets, depends on the individual requirements and implementations. For example, one implementation may contain the requirement that a PAP password always needs to be given, another may require a PAP password only under specific conditions and yet another may have no provision for PAP. Examples of two CSD-PPP peers interacting are given in the following, and constitute further embodiments of the present invention that are based upon the above described embodiment.

As a further embodiment, a CSD-PPP peer may change predefined LCP or IPCP settings by sending an appropriate masked LCP or IPCP packet as part of the above mentioned initial set of masked packets. An example of such a change of settings is adjusting the MRU to a value between 296 and 1500. If such a change is enacted, then the receiving CSD-PPP peer may accept this or not. The receiving CSD-PPP peer therefore responds with a masked ACK (acknowledged) or NACK (not acknowledged).

As yet another embodiment, CSD-PPP peers can support both PAP and CHAP, but the CSD-PPP peer in the AU (see FIG. 3) dictates the authentication protocol to be used. If authentication is required, IP packets received during the authentication phase by a CSD-PPP peer must be buffered (i.e. temporarily stored) and must not be forwarded to the receiving IP peer (i.e. a peer in the internet to which the CSD-PPP peer in the TE is supposed to be connected via the CSD-PPP peer in the AU) before the authentication phase has succeeded.

In case of an exception from the CSD-PPP peer operation as defined above, e.g. the authentication fails while an IP address has already been assigned and/or IP packets have already been received, the link must be terminated, an IP address assigned by the AU must be de-allocated and received IP packets must be discarded.

Figure 5:
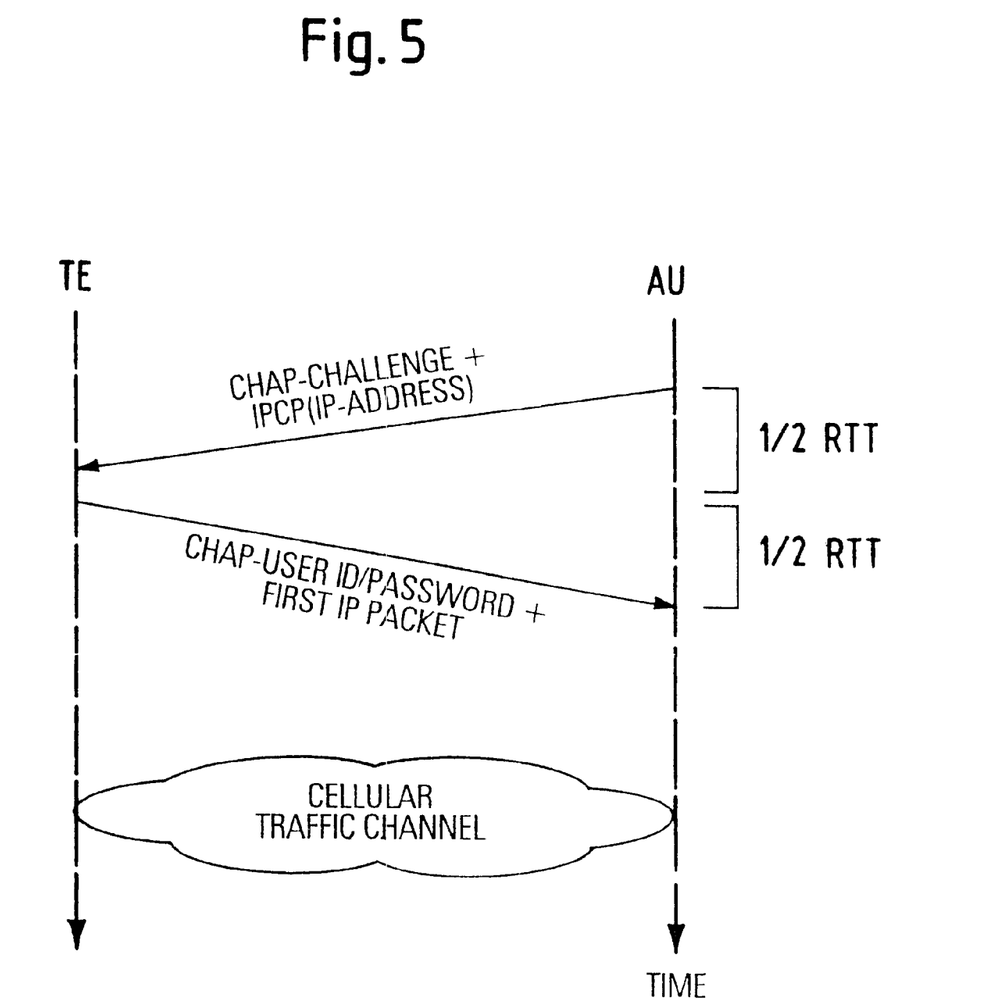
FIG. 5 shows a sequence of packets exchanged between the mobile node and network node when establishing a link in accordance with an embodiment of the present invention.
Figure 6:
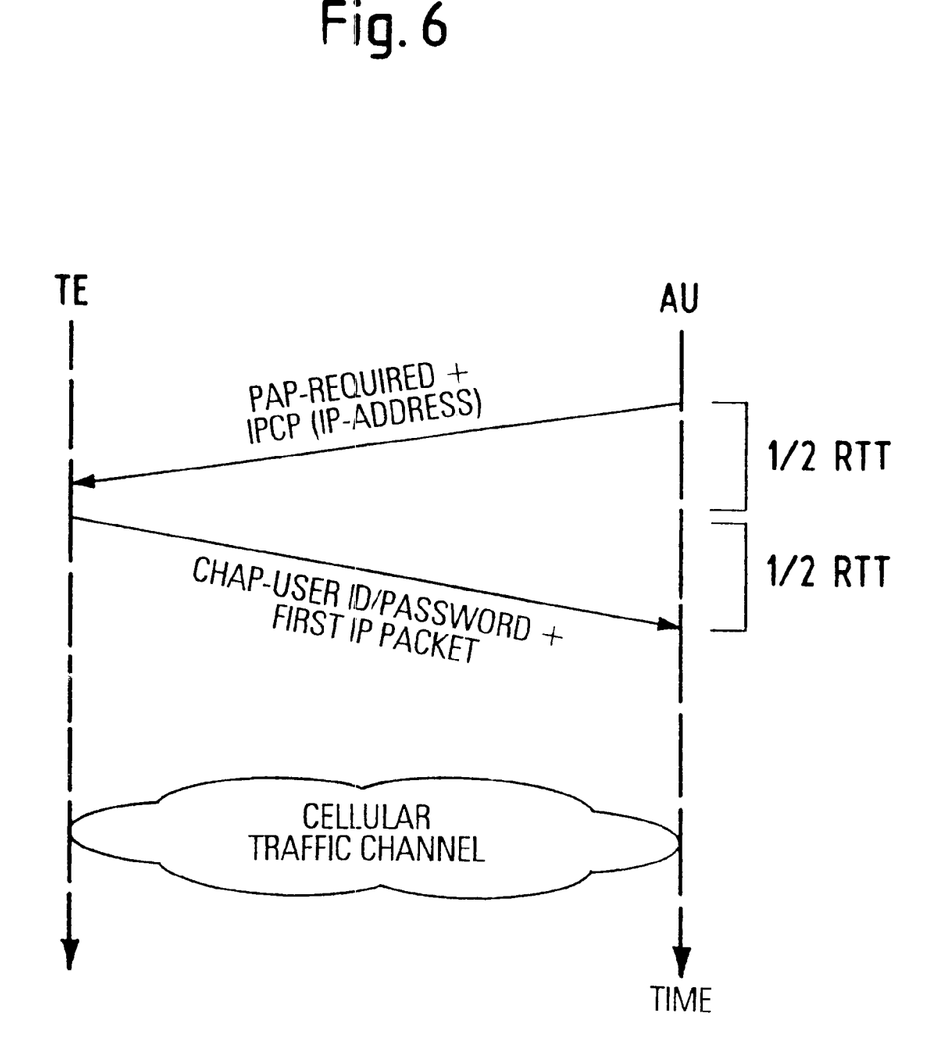
FIG. 6 shows a sequence of packets exchanged between the mobile node and network node when establishing a link in accordance with another embodiment of the present invention.
Figure 7:
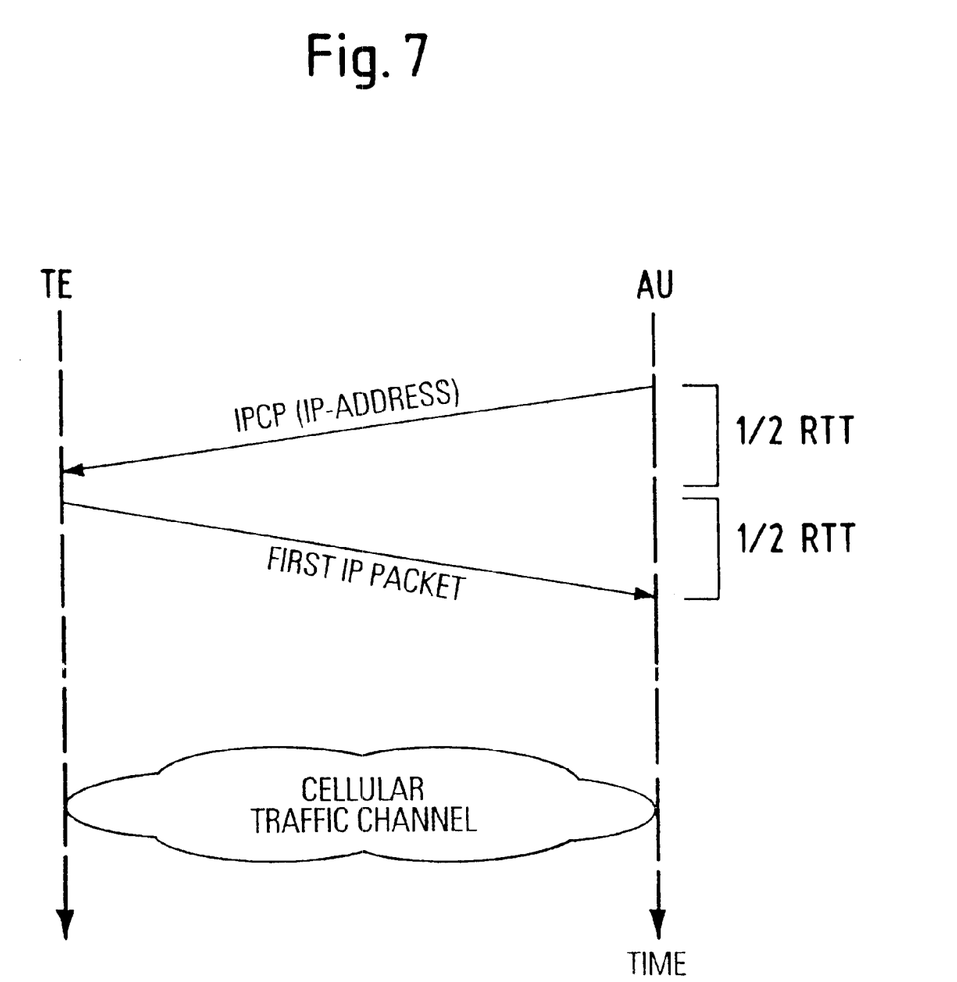
FIG. 7 shows a sequence of packets exchanged between the mobile node and network node when establishing a link in accordance with yet another embodiment of the present invention.

In the following, examples will be explained in connection with diagrams in FIGS. 5 to 7, which can be compared with the procedure required by standard PPP shown in FIG. 4. As in the case of FIG. 4, it is assumed in FIG. 5 to 7 that a peer in the TE (see FIG. 3) communicates with a peer in the AU, only that FIG. 5 to 7 show CSD-PPP peers and FIG. 4 shows standard PPP peers. Also, similar to FIG. 4, the communication shown in FIG. 5 to 7 is a simplification for the purpose of explanation, as the actual communication will always take place in the opposing direction as well, i.e. the communication is always bi-directional. As already explained in connection with FIG. 4, this means that although FIGS. 5 to 7 show a first transmission from the AU to the TE, the TE almost simultaneously starts sending its packets, i.e. a first standard LCP packet, and then back-to-back a first set of masked packets. In other words, the two sides both start sending in reponse to the signal that the link is up, where both sides will generally determine at about the same time that the link is up.

Also for reasons of simplicity and for a better overview, the optional masked LCP and IPCP packets for changing predefined settings and the corresponding ACKs and NACKs described above have not been included in FIGS. 5 to 7.

Furthermore, an initial masked LCP packet (which is preferably sent, even in the case that no change in predefined settings is requested, in which case said packet is empty), which is sent back to back after the standard LCP packet by a CSD-PPP peer in order to identify itself as a CSD-PPP peer, is not shown.

Finally, the standard LCP packet which is sent out ahead of the initial masked packets is also not shown. All of the packets shown in FIGS. 5 to 7 are therefore masked packets.

FIG. 5 shows an embodiment, in which the AU requires CHAP (Challenge Handshake Authentication Protocol). Consequently, in response to the link up message, the AU first sends a standard LCP packet followed back to back by a masked LCP packet (not shown, as explained above) and then the AU sends a CHAP-Challenge. Furthermore, the AU also sends an IPCP packet back to back with the CHAP packet, so that these two packets together with the preceding masked LCP packet (not shown) form a set of masked packets, which enable the system to concurrently perform configuration, authentication and network control. In response to this set, the TE sends the user-ID and/or password corresponding to the CHAP packet and also the first IP packet. Therefore, authentication and network layer packet exchange is performed concurrently, so that the exchange of network layer (IP) packets already begins after 0.5 RTT. This is a considerable gain of speed with respect to standard PPP shown in FIG. 4. It should again be noted that FIG. 4 shows the minimum (i.e. ideal) configuration process for standard PPP.

FIG. 6 shows an embodiment, in which the AU requires PAP (Password Authentication Protocol). The procedure is very similar to the one shown in FIG. 5, except that it should be remarked that the packet indicating that PAP is required, is an appropriate masked LCP packet indicating this change of predefined settings as PAP is not a predefined setting. In other words, in response to the link up message, the AU first sends out the standard LCP packet (not shown) and then sends out said masked LCP packet requesting PAP, after which an IPCP packet is sent out, similarly to the embodiment shown in FIG. 5. In response thereto, the TE sends the PAP user ID and/or password, as well as a first IP packet. As in the case of FIG. 5, the network layer packet exchange can begin after 0.5 RTT.

Finally, FIG. 7 shows an embodiment in which authentication is not required or requested and the AU sends a masked IPCP packet after the initial standard LCP packet and masked LCP packet (not shown, as explained above), to which the TE responds by sending the first masked IP packet. Again, the network layer packet exchange can begin after 0.5 RTT.

The above described embodiments achieve a reduced overall connection time for internet access via cellular networks. Independent of whether authentication is required or not, the configuration from point to point is reduced to 0.5 RTT. The gained advantage is a minimum of 1.5 or 2.5 RTT respectively with or without authentication in the standard PPP (see FIG. 4, as compared with FIG. 5 to 7). In a GSM cellular network this e.g. corresponds to a minimum of about 1000 ms without authentication and 1600 ms with authentication. In most cases the gain will be much higher and will most commonly be around 2 to 4 seconds and can be as high as 4 to 8 seconds.

It may be noted that in the above embodiments described in connection with FIGS. 5, 6 and 7, the first IP packet (or more generally the first network packet) is only sent after the TE has received the source IP address from the AU in the described IPCP packet. However, in accordance with another embodiment of the present invention, it is also possible that the TE sends the first IP packet and possibly further IP packets with the first set of masked packets sent after the link is up. These IP packets will not have an source IP address in the appropriate field. In this case, the AU will insert the missing address into these IP packets. After the TE has received the IP address from the AU, the TE itself can write the address into the subsequent IP packets, as in the previously described embodiments.

In the above embodiment it is therefore possible to start the desired data communication (i.e. the sending of IP packets) immediately after the underlying link is up.

This will be explained in somewhat more detail with respect to FIGS. 8, 9 and 10, which correspond to FIGS. 5, 6 and 7, respectively. In all three Figures, it will be assumed that the IP packet sending implementation (TE) and the IP receiving implementation (AU) determine at the same time that the link is up and accordingly start sending packets at the same time. Again, the standard LCP packet and first masked LCP packet are not shown.

Figure 8:
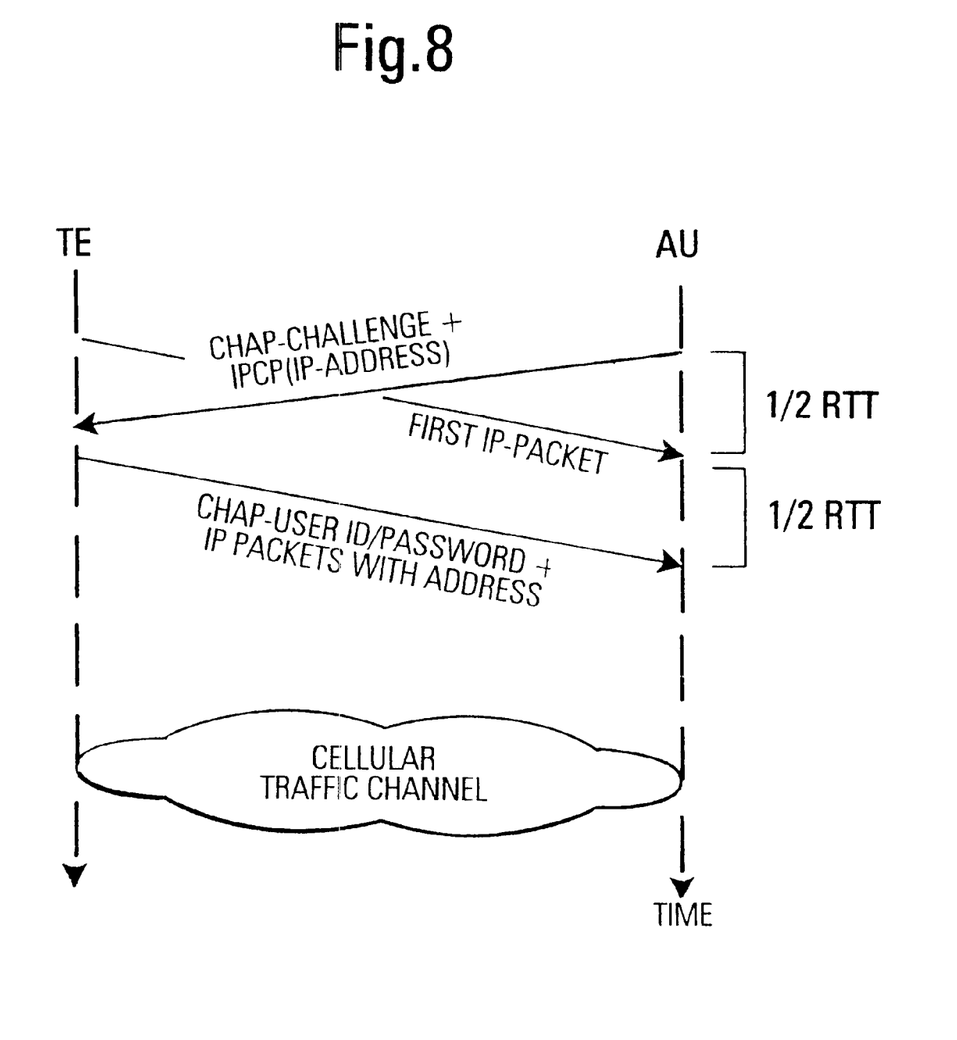
FIG. 8 shows a sequence of packets exchanged between the mobile node and network node when establishing a link corresponding to the embodiment of FIG. 5, except that a first IP packet is sent by the mobile node prior to having received the IP address from the network node.

In the case of FIG. 8, which shows a situation corresponding to that of FIG. 5, the TE sends a first IP packet (and possibly more) in the packet train sent immediately after having determined that the link is up. This IP packet will not have the IP address in the appropriate field, however the implementation of this embodiment is such that the packet will be sent none the less. It should again be noted that the initial standard LCP packet and masked LCP packet sent by the TE are not shown for reasons of simplicity. In the situation shown in FIG. 8, a CHAP is assumed to be required. The implementation of this embodiment is such that the AU will therefore buffer the one or more IP packets until the CHAP authentication is received. When it has been determined by the AU that the CHAP challenge has been correctly answered, i.e. the TE has correctly identified itself, the AU will insert the missing IP address and pass the corresponding IP packet (or packets) on. The other IP packets sent by the TE after having received the IP address from the AU, will have the IP address in the appropriate field, so that these may be handled as usual by the AU.

Figure 9:
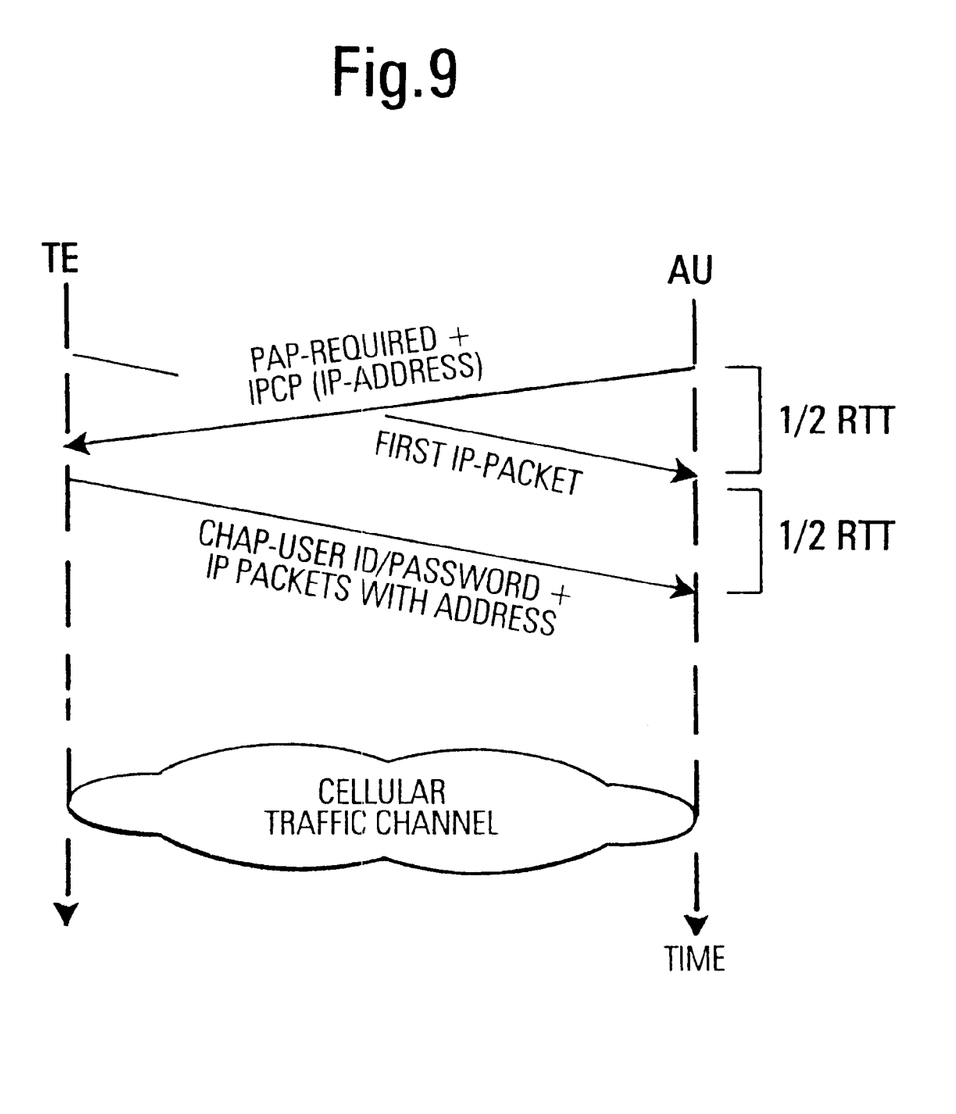
FIG. 9 shows a sequence of packets exchanged between the mobile node and network node when establishing a link corresponding to the embodiment of FIG. 6, except that a first IP packet is sent by the mobile node prior to having received the IP address from the network node.

A similar situation is shown in FIG. 9, which corresponds to FIG. 6. Here the AU sends a packet that PAP is required, followed by the IP address, while simultaneously the TE sends a first IP packet lacking the IP address. The AU will buffer the IP packet until having received the correct password, and then insert the IP address and pass the IP packet on. The IP packets sent by the TE after having received the IP address will have the address contained in them.

The embodiment described in connection with FIG. 9 may also be modified in the following way. The implementation in the TE could be such that it is possible to set the TE to send the PAP password in the first train of masked packets, without having received any requirement message. If the TE is set to send the User-ID or password with the first train of masked packets right after the link is up, i.e. automatically without having received the message that PAP is required, the AU will receive the password right away and it is not necessary to buffer the first IP packet(s). The AU can then immediately check the password. If it is correct, the missing source IP address can be inserted into the received IP packets and these packets can be passed on without delay. Such a capability is especially advantageous for implementations in equipment that will generally always establish a connection to the same partner, e.g. for a user who always connects to the same internet service provider.

Naturally, this capability is not restricted to PAP passwords, but can be implemented in connection with any possible password or identification scheme. It has the advantage of further reducing the delay for the IP packets.

Figure 10:
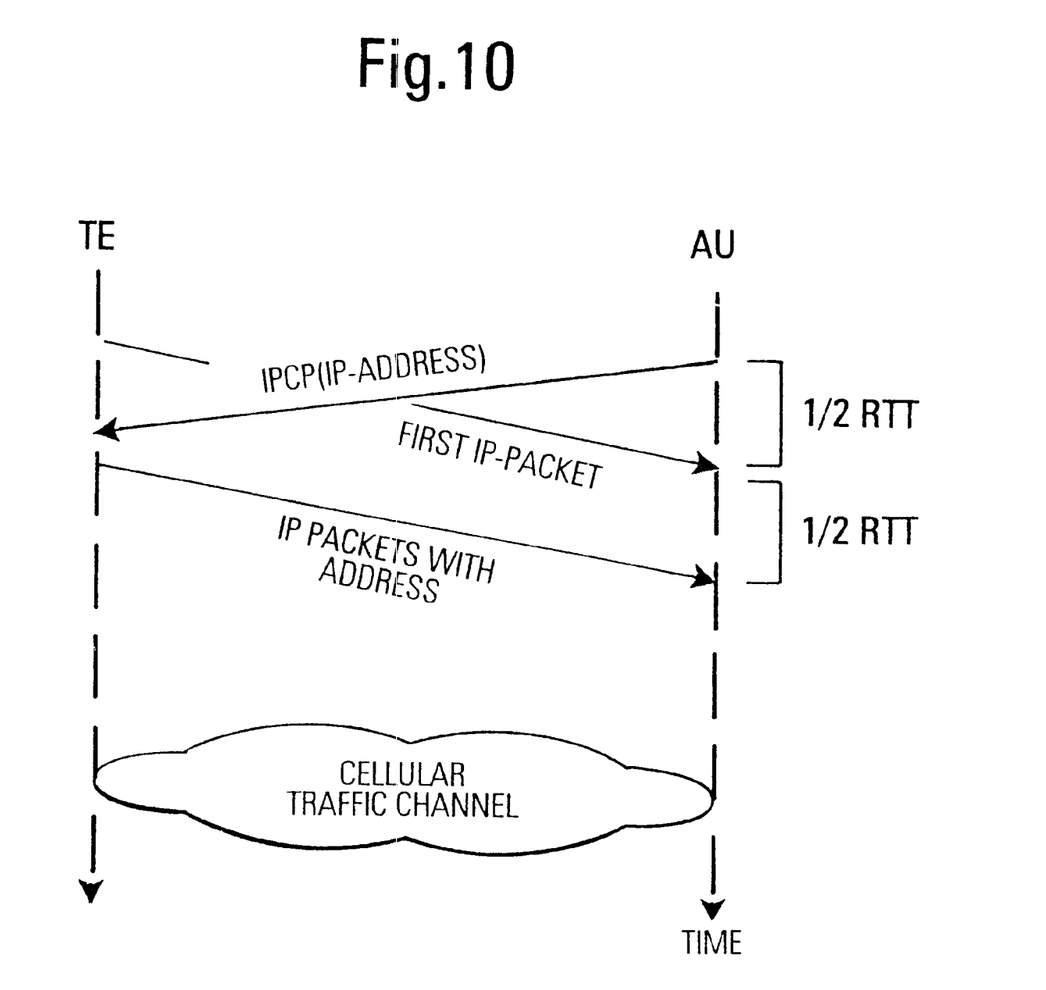
FIG. 10 shows a sequence of packets exchanged between the mobile node and network node when establishing a link corresponding to the embodiment of FIG. 7, except that a first IP packet is sent by the mobile node prior to having received the IP address from the network node.

In FIG. 10, which corresponds to FIG. 7, the situation is simpler still, because the AU does not need to buffer the IP packets. More precisely speaking, the AU sends the IP address, while the TE sends a first IP packet lacking the IP address. This IP packet is simply received by the AU, which inserts the IP address and then passes the packet on. Again, as in the previous cases, the packets sent by the TE after having received the IP address from the AU will contain the appropriate IP address.

In a general sense, this means that when the implementation acts as a sender of network packets (e.g. IP packets), it may send first network packets in the first train of masked packets following the determination that the link is up, even though these packets will not contain the network address. Depending on the situation, the implementation acting as a receiver will appropriately treat these networks packets by inserting the network address into them, and possibly buffering them until predetermined conditions depending on the given situation are fulfilled.

The present invention is not restricted to the above examples, which were given to better understand the present invention and to give the person skilled in the art a detailed description of what the inventors presently consider the best mode of putting the invention to practice.

For example, the present invention is not restricted to modifying the Point-to-Point Protocol of RfC 1661, but can naturally be applied to any protocol having the properties outlined in the independent claims. In other words, the present invention can e.g. advantageously be applied to any "chatty" protocol that requires an excessive amount of packet exchanges. As a consequence, the specific protocols mentioned above in connection with masked packets (LCP, CHAP, PAP etc.) can be replaced or complemented by other protocols, as is appropriate for the chosen application.

Also, the present invention is not restricted to configuring the specific example of a circuit switched link shown in FIG. 3. It can be applied to any type of circuit switched link. Moreover, the present invention is not restricted to circuit switched links. Much rather it can be applied to any type of link. The advantages will be especially pronounced in connection with high-latency links, such as circuit switched links in cellular networks, but they will be equally pronounced when applying the invention e.g. to satellite links, which also typically have a high latency.

Therefore, although the present invention has been described in terms of detailed examples, it should be appreciated that the present invention is by no means restricted thereto. Many modifications and variations will occur to the person skilled in the art, depending on specific requirements and constraints. Therefore the scope of the invention is defined by the appended claims and their equivalents.

Reference numerals in the claims serve to facilitate understanding and do not restrict the scope.

What is claimed is:

1. A method for controlling a communication device that is
connected to another communication device by a communication link, for configuring said communication link for packet exchange, where one of said two communication devices is on the other side connected to a packet exchange network conforming to a first protocol (IP), wherein said method comprises the possibility of controlling said device such that the communication between said communication devices over said link is conducted by exchanging packets in accordance with a second predetermined protocol (PPP) that encapsulates at least said first protocol (IP) and comprises a third protocol (LCP) for establishing and configuring said link, and wherein said second protocol (PPP) requires that
a packet sent over said link comprises a protocol field (1), for which predetermined values are reserved for predetermined protocols, where at least one specific value is reserved for said third protocol (LCP), and other predetermined values are not reserved by said second protocol (PPP), and an information field (2) containing data associated with the protocol indicated by the value contained in said protocol field (1), and the process of configuring a link comprises at least one phase in which packets are exchanged such that only packets indicating said third protocol (LCP) in their protocol fields are processed and all other packets are discarded, said method furthermore comprising the steps:

sending out a packet of a first type over said link that conforms to said second protocol (PPP) and indicates said third protocol (LCP) in its protocol field, and subsequently sending out at least one packet of a second type that has a value in its protocol field that is allowed by said second protocol (PPP) but not reserved by said second protocol (PPP), such that said second packet is not rejected by communications devices operating in accordance with said second protocol (PPP), but is discarded without processing by these, waiting for the receipt of a packet of said first type and storing said packet once it is received, waiting a predetermined time for the subsequent receipt of a packet of said second type, processing said stored packet of said first type if no packet of the second type is received and subsequently operating in accordance with said second protocol (PPP), and processing said packet of the second type if such a packet is received.

2. The method of claim 1, wherein said at least one packet of said second type is sent back to back with said packet of said first type.

3. The method of claim 1, wherein a plurality of packets of the second type is sent after said packet of the first type, said packets contained in said plurality being sent back to back.

4. The method of claim 1, wherein said communications link is a serial link.

5. The method of claim 4, wherein said communications link is a circuit switched link or a satellite link.

6. The method of claim 1, wherein said first protocol (IP)

is an internet protocol, said second protocol (PPP) is a standard point-to-point protocol, and said third protocol (LCP) is a link configuration protocol.

7. The method of claim 6, wherein said standard point-to-point protocol conforms to RfC 1661.

8. The method of claim 6, wherein said packet of the first type is a link configuration protocol packet conforming to said standard point-to-point protocol and said at least one subsequent packet of the second type is a link configuration protocol packet having a value in its protocol field that is in a range that is allowed for packets conforming to said standard point-to-point protocol, but which is not reserved for use by said standard point-to-point protocol.

9. The method of claim 8, wherein said link configuration protocol packet of the second type is followed by at least one of a password authentication protocol packet, a link quality report packet, a challenge handshake authentication protocol packet, an internet protocol configuration protocol packet and an internet protocol packet, each of said one or more packets following said link configuration protocol packet of the second type also being of the second type.

10. The method of claim 3, wherein if said communication device acts as a sender (TE) of network layer protocol packets, at least one network layer protocol packet is sent in said plurality of packets of the second type, said at least one network layer protocol packet lacking the appropriate network protocol source address, and if said communication device acts as the receiver (AU) of network layer protocol packets for passing them on to a network destination, said communication device inserts the network protocol source address into those network layer protocol packets lacking the appropriate network protocol source address.

11. The method of claim 10, wherein if said communication device acts as the receiver (AU) of network layer protocol packets, said communication device buffers those network layer protocol packets lacking the appropriate network protocol source address until a predetermined condition is fulfilled.

12. The method of claim 10, wherein said network layer protocol packets are internet protocol packets and said network protocol address is an internet protocol address.

13. A communication device that is controlled to be connected to another communication device by a communication link, said device being controlled for configuring said communications link for packet exchange, where one of said two communication devices is on the other side connected to a packet exchange network conforming to a first protocol (IP), wherein said controlling comprises the possibility of controlling said device such that the communication between said communication over said link is conducted by exchanging packets in accordance with a second predetermined protocol (PPP) that encapsulates at least said first protocol (IP) and comprises a third protocol (LCP) for establishing and configuring said link, and wherein said second protocol (PPP) requires that a packet sent over said link comprises a protocol field (1), for which predetermined values are reserved for predetermined protocols, where at least one specific value is reserved for said third protocol (LCP), and other predetermined values are not reserved by said second protocol (PPP), and an information field (2) containing data associated with the protocol indicated by the value contained in said protocol field (1), and the process of configuring a link comprises at least one phase in which packets are exchanged such that only packets indicating said third protocol (LCP) in their protocol fields are processed and all other packets are discarded, said device furthermore having:

a sending means for sending out a packet of a first type over said link that conforms to said second protocol (PPP) and indicates said third protocol (LCP) in its protocol field, and a sending means for subsequently sending out at least one packet of a second type that has a value in its protocol field that is allowed by said second protocol (PPP) but not reserved by said second protocol (PPP), such that said second packet is not rejected by communications devices operating in accordance with said second protocol (PPP), but is discarded without processing by these, a storing and waiting means for storing a packet of said first type after its receipt, and for waiting a predetermined time for the subsequent receipt of a packet of said second type, a processing means for processing said stored packet of said first type if no packet of the second type is received and for subsequently controlling the device to operate in accordance with said second protocol (PPP), and a processing means for processing said packet of the second type if such a packet is received.

14. The device of claim 13, wherein said at least one packet of said second type is sent back to back with said packet of said first type.

15. The device of claim 13, wherein a plurality of packets of the second type is sent after said packet of the first type, said packets contained in said plurality being sent back to back.

16. The device of claim 13, wherein said communications link is a serial link.

17. The device of claim 16, wherein said communications link
is a circuit switched link or a satellite link.

18. The device of claim 13, wherein said first protocol (IP) is an internet protocol, said second protocol (PPP) is a standard point-to-point protocol, and said third protocol (LCP) is a link configuration protocol.

19. The device of claim 18, wherein said standard point-to-point protocol conforms to RfC 1661.

20. The device of claim 18, wherein said packet of the first type is an link configuration protocol packet conforming to said standard point-to-point protocol and said at least one subsequent packet of the second type is a link configuration protocol packet having a value in its protocol field that is in a range that is allowed for packets conforming to said standard point-to-point protocol, but which is not reserved for use by said standard point-to-point protocol.

21. The device of claim 20, wherein said link configuration protocol packet of the second type is followed by at least one of a password authentication protocol packet, a link quality report packet, a challenge handshake authentication protocol packet, an internet protocol configuration protocol packet and an internet protocol packet, each of said one or more packets following said link configuration protocol packet of the second type also being of the second type.

22. A method for controlling a communication device that is
connected to another communication device by a communication link, for configuring said communication link for packet exchange, where one of said two communication devices is on the other side connected to a packet exchange network conforming to a network protocol, wherein said method comprises the possibility of controlling said device such that the communication between said communication devices over said link is conducted by exchanging packets in accordance with a point-to-point protocol that encapsulates at least said network protocol and comprises a link configuration protocol for establishing and configuring said link, and wherein said point-to-point protocol requires that a packet sent over said link comprises a protocol field, for which predetermined values are reserved for predetermined protocols, where at least one specific value is reserved for said link configuration protocol, and other predetermined values are not reserved by said point-to-point protocol, and an information field (2) containing data associated with the protocol indicated by the value contained in said protocol field (1), and the process of configuring a link comprises at least one phase in which packets are exchanged such that only packets indicating said link configuration protocol in their protocol fields are processed and all other packets are discarded, said method furthermore comprising the steps:
sending out a packet of a first type over said link that conforms to said point-to-point protocol and indicates said link configuration protocol in its protocol field, and subsequently sending out at least one packet of a second type that has a value in its protocol field that is allowed by said point-to-point protocol but not reserved by said point-to-point protocol, such that said second packet is not rejected by communications devices operating in accordance with said point-to-point protocol, but is discarded without processing by these, waiting for the receipt of a packet of said first type and storing said packet once it is received, waiting a predetermined time for the subsequent receipt of a packet of said second type, processing said stored packet of said first type if no packet of the second type is received and subsequently operating in accordance with said point-to-point protocol, and processing said packet of the second type if such a packet is received.

23. A method for controlling a communication device that is connected to another communication device by a communication link, for configuring said communication link for packet exchange, where one of said two communication devices is on the other side connected to a packet exchange network conforming to a first protocol (IP), wherein said method comprises the possibility of controlling said device such that the communication between said communication devices over said link is conducted by exchanging packets in accordance with a second predetermined protocol (PPP) that encapsulates at least said first protocol (IP) and comprises a third protocol (LCP) for establishing and configuring said link, and wherein said second protocol (PPP) requires that a packet sent over said link comprises a protocol field (1), for which predetermined values are reserved for predetermined protocols, where at least one specific value is reserved for said third protocol (LCP), and other predetermined values are not reserved by said second protocol (PPP), and an information field (2) containing data associated with the protocol indicated by the value contained in said protocol field (1), and the process of configuring a link comprises at least one phase in which packets are exchanged such that only packets indicating said third protocol (LCP) in their protocol fields are processed and all other packets are discarded, said method furthermore comprising the steps:
sending out a packet of a first type over said link that conforms to said second protocol (PPP) and indicates said third protocol (LCP) in its protocol field, and subsequently sending out a plurality of packets of a second type each having a value in its protocol field that is allowed by said second protocol (PPP) but not reserved by said second protocol (PPP), such that said plurality is not rejected by communications devices operating in accordance with said second protocol (PPP), but is discarded without processing by these, waiting for the receipt of a packet of said first type and storing said packet once it is received, waiting a predetermined time for the subsequent receipt of a packet of said second type, processing said stored packet of said first type if no packet of the second type is received and subsequently operating in accordance with said second protocol (PPP), and processing said packet of the second type if such a packet is received, and wherein if said communication device acts as a sender (TE) of network layer protocol packets, at least one network layer protocol packet is sent in said plurality of packets of the second type, said at least one network layer protocol packet lacking the appropriate network protocol source address, and if said communication device acts as the receiver (AU) of network layer protocol packets for passing them on to a network destination, said communication device inserts the network protocol source address into those network layer protocol packets lacking the appropriate network protocol address.

* * * * *